(12) United States Patent
Parkinson (10) Patent No.: US 7,958,349 B2
(45) Date of Patent: Jun. 7, 2011

(54) METHOD FOR REVOKING A DIGITAL SIGNATURE

(75) Inventor: Steven W. Parkinson, San Jose, CA (US)

(73) Assignee: Red Hat, Inc., Raleigh, NC (US)

( * ) Notice: Subject to any disclaimer, the term of this patent is extended or adjusted under 35 U.S.C. 154(b) by 950 days.

(21) Appl. No.: 11/897,461

(22) Filed: Aug. 30, 2007

(65) Prior Publication Data

US 2009/0063854 A1    Mar. 5, 2009

(51) Int. Cl.
*H04L 9/00* (2006.01)
(52) U.S. Cl. .................. 713/158; 713/155; 713/156
(58) Field of Classification Search .................. 713/158, 713/176, 177
See application file for complete search history.

(56) References Cited

U.S. PATENT DOCUMENTS

| | | | |
|---|---|---|---|
| 2002/0004773 A1* | 1/2002 | Xu et al. | 705/36 |
| 2005/0065799 A1* | 3/2005 | Dare et al. | 705/1 |
| 2005/0132194 A1* | 6/2005 | Ward | 713/176 |
| 2007/0101146 A1* | 5/2007 | Louch et al. | 713/176 |

* cited by examiner

*Primary Examiner* — Ponnoreay Pich
(74) *Attorney, Agent, or Firm* — Lowenstein Sandler LLP (57) ABSTRACT

A method and apparatus for revoking a digital signature using a signature revocation list. In one embodiment, the method includes generating the signature revocation list to indicate revocation status of a signature. The signature is created from an encryption key and a document. The method also includes computing an identifier of the signature in the signature revocation list based on contents of the signature. The method further includes publishing the signature revocation list for access by users of the document.

25 Claims, 6 Drawing Sheets

PROCESS OF THE REVOCATION AUTHORITY

FIG. 4

PROCESS OF VERIFYING A SIGNATURE

FIG. 5

PROCESS OF VERIFYING A SIGNATURE IN RESPONSE TO AN ONLINE REQUEST

FIG. 6

METHOD FOR REVOKING A DIGITAL SIGNATURE

TECHNICAL FIELD

Embodiments of the present invention relate to cryptographic techniques, and more specifically, to revocation of a digital signature in a signed document.

BACKGROUND

A public key infrastructure (PKI) is an arrangement that binds a public key with a user identity by means of a digital certificate issued by a certificate authority. A certificate authority is a trusted entity which issues digital certificates for use by other parties. A digital certificate includes a public key and the identity of the owner of the public key. By signing the certificate, the certificate authority attests that the public key contained in the certificate belongs to the person, organization, server, or other entity noted in the certificate.

During the operation of a PKI system, some of the issued certificates may be revoked for various reasons, e.g., the private-key corresponding to the public key has been compromised, or the entity identified in the certificate fails to adhere to a policy required by the certificate authority. A certificate revocation list is a list of certificates which have been revoked, are no longer valid, and should not be relied upon by any system user. Typically, the certificate revocation list uses the serial numbers of the revoked certificates as identifiers.

When a certificate is revoked, the private key corresponding to the public key in the certificate can no longer be used by the certificate owner to sign any documents. That is, certificate revocation affects all uses of the private key on all documents. If the certificate revocation is effective at a specific time, all uses of the private key on all documents after the specific time are revoked. Certificate revocation does not address the situation in which a single use of the private key on a document is invalid while the private key and the document are both valid. Once a certificate is revoked, the owner cannot use the certificate for signing any document, even though the private key is still valid with respect to signing some selective documents.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for revoking a digital signature using a signature revocation list. In one embodiment, the signature revocation list is created by a trusted entity and periodically published in a well-known publicized networked location. A recipient of a signed document can access the published signature revocation list to check whether the signature in the signed document has been revoked. A signature is identified in the signature revocation list by its corresponding signature hash, which is generated by hashing the signature. In some embodiments, each signature in the signature revocation list is associated with a signature revocation time and the reason for revocation.

One approach to generating a signature is to encrypt a hashed document (also referred to as a document hash) with a private key. A private key is assigned to a signer of a document and can serve as an identifier of the signer. Thus, a signature, as well as its corresponding signature hash, is a function of the document signed with the signature and the identity of the signer. Therefore, in one embodiment, a signature hash is used as an identifier of a signed document in a signature revocation list. In some embodiments, a signature can further comprise a signing time of the document. Thus, when the same private key is used to sign the same document multiple times, the signing time can be used to distinguish the different instances of the signatures, and to selectively revoke some of the instances based on the different signing times.

Signing documents with digital signatures may be useful when the document size is large and manual signing would require a written signature on every page of the document (e.g., a real estate sales contract). Thus, replacing written signatures with digital signatures increases the efficiency of document signing. Revoking a digital signature, in this example, may occur when the signing is defective (e.g., without the presence of a notary public), but the document and the signing party's private key are both valid. Using the signature revocation technique described herein, the signing party's ability to use the private key for signing other documents or for signing the same document at a later time will not be affected by the revocation.

In another example, the signer of a document may have several private keys, one for work, one for personal use, and one for other purposes. The signer may accidentally use the personal private key to sign a work document. In this situation, both the document and the private key used for signing are valid. However, it is the particular use of the key on the document that should be revoked. A signature revocation list, as described herein, can be used to revoke a particular one or more uses of the key on a document without revoking the use of the same key on other documents.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "updating", "computing", "publishing", "associating", "signing", "hashing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Figure 1:
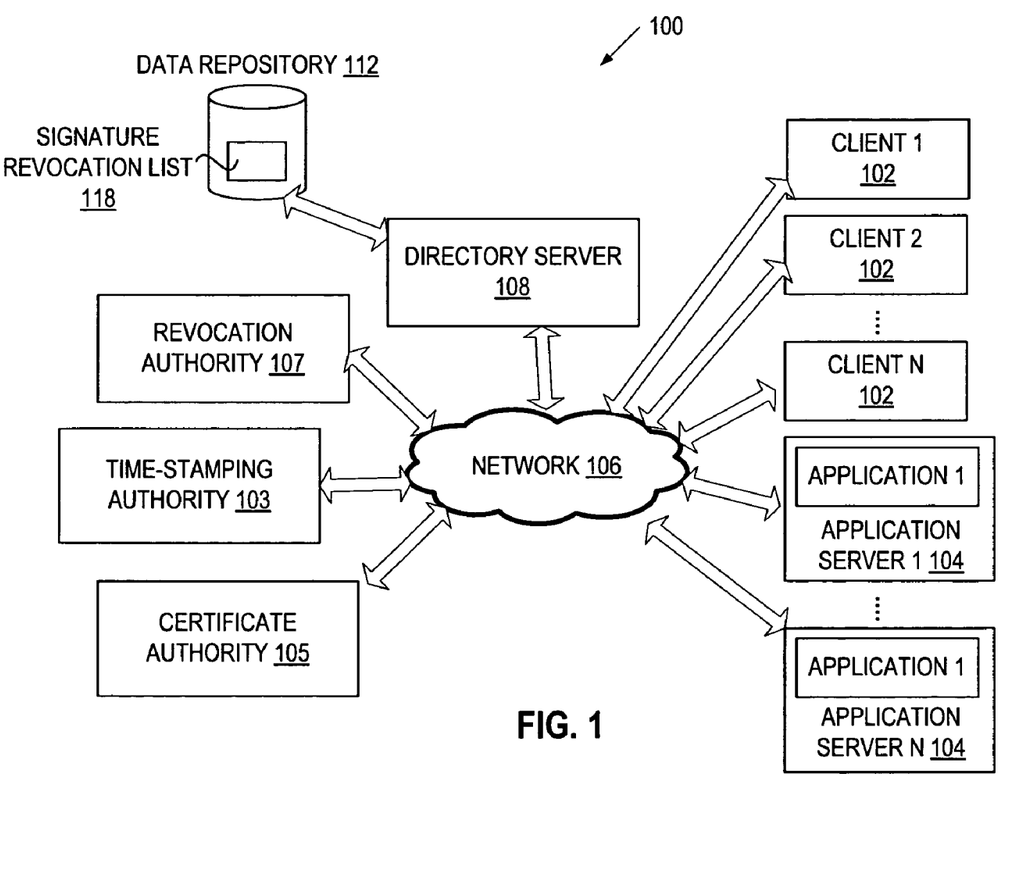
FIG. 1 illustrates a network architecture in which embodiments of the present invention may be implemented.

FIG. 1 illustrates an exemplary network architecture 100 in which embodiments of the present invention may operate. The network architecture 100 may include client devices (clients) 102, a directory server 108, a certificate authority 105, a revocation authority 107 and a network 106. The clients 102 may be, for example, personal computers (PCs), mobile phones, palm-sized computing devices, personal digital assistants (PDAs), and the like. The certificate authority 105 may be a server trusted to issue digital certificates to other entities ("certificate owners") via the network 106. Typically, a digital certificate includes the identity and a public key of the certificate owner. The revocation authority 107 may be a server trusted to issue statements about revocation status of a signature. The issued statements may be a signature revocation list published to a publicized networked location.

The directory server 108 may be a server located in a publicized networked location to receive the signature revocation list and to provide access to the signature revocation list. In one embodiment, the directory server 108 may be a Light Weight Directory Access Protocol (LDAP) directory server. The directory server 108 may contain a server front-end responsible for network communications, plugins for server functions (such as access control and replication), a basic directory tree containing server-related data, and a database back-end plugin responsible for managing the storage and retrieval of repository data.

The clients 102 are coupled to the directory server 108, the certificate authority 105 and the revocation authority 107 via the network 106, which may be a public network (e.g., Internet) or a private network (e.g., Ethernet or a local area Network (LAN)). In one embodiment, the clients 102 communicate with the directory server 108 via a web server (not shown). For example, the clients 102 may host web browsers that communicate with the web server using HTTP to request information. The web server may then communicate with the directory server 108 to retrieve requested information from a data repository 112. Alternatively, the clients 102 may communicate directly with the directory server 108 to request information stored in the data repository 112. The data repository 112 may be part of the directory server 108, or it may reside externally (e.g., on a database server). In one embodiment, the data repository 112 stores a signature revocation list 118.

The network architecture 100 may also include one or more application servers 104 that host various applications requesting information from the directory server 108. The application servers 104 operate as clients in communication with the directory server 108. Similarly to the clients 102, the application servers 104 may communicate with the directory server 108 directly or via a web server.

The network architecture 100 may further include a time-stamping authority 103 coupled to the network 106. The time-stamping authority 103 is a server that creates a trusted digital timestamp on a signed document at the time a signature is created. A timestamp provides a trusted measure for a recipient of a signed document to know when the document was signed. If a signer's certificate had been revoked at a revocation time prior to signing the document, the timestamp prevents the signer from creating a signature that purports to be for a period before the revocation time.

Before providing further details on signature revocation, it is useful to describe some embodiments of a process of signature creation. Initially, a document source (e.g., the client 102 or the application server 104) creates a document D. The document source computes a document hash H by applying a hash function, such as SHA-1, SHA-256, SHA-512, MD5, or the like, to the document D. The document source then encrypts the document hash H using its private key to produce an encrypted document hash T. Subsequently, the document source creates a digital signature S for the document D. The signature S comprises a hash function identifier, the encrypted document hash T, and a signing certificate. The signing certificate is issued from a certificate authority (e.g., the certificate authority 105) and contains the public key of the document source. Then the document D is transmitted with the signature S to the recipient. Thus, a signature of a document is a function of the document and the private key used to encrypt the document.

In some embodiments, after creating the signature S, the document source sends the signature S to a time-stamping authority (e.g., the time-stamping authority 103) for time stamping. The time-stamped signature TSS, including the signature S and a signing time, is signed by the time-stamping authority to prove authenticity of the timestamp. The document source may transmit the document D to the recipient of the signed document along with the time-stamped signature TSS instead of the signature S.

Figure 2:
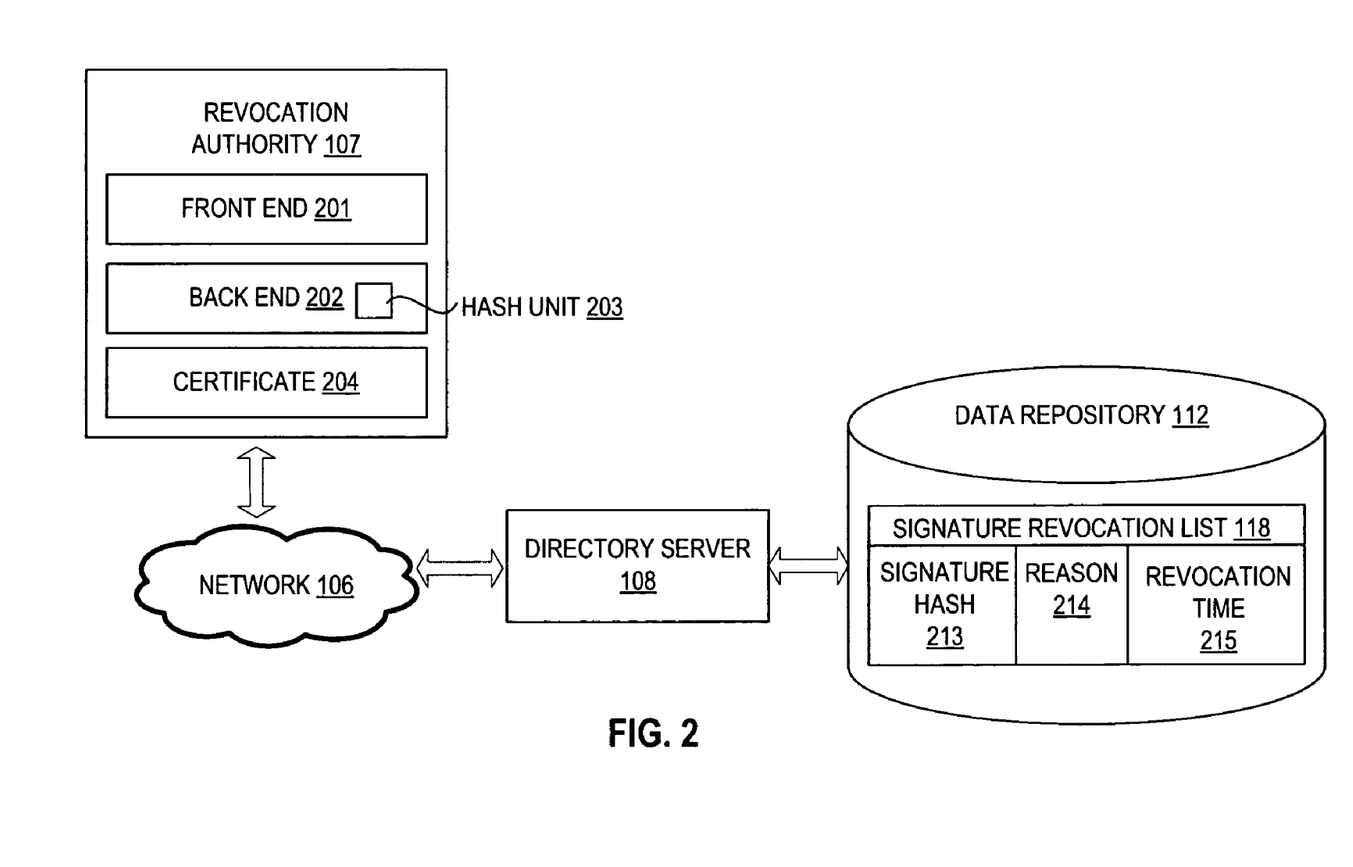
FIG. 2 is a block diagram of a revocation authority that generates a signature revocation list.

FIG. 2 shows an embodiment of the revocation authority 107, the data repository 112, and the directory server 108. The revocation authority 107 includes a front end 201 and a back end 202. The front end 201 identifies revocation requests submitted from clients 102 and application servers 104, and forwards these requests to the back end 202 for processing. A revocation request typically includes a signature or a signature hash of a signed document, a reason for revocation, and optionally, a revocation time. If no revocation time is indicated, the revocation will be made to all instances of the signature regardless of the signing time. A signature hash is produced by hashing the signature by a hash function. The signature hash, like the signature, is a function of the document and the encryption key used to encrypt the document. A signature hash generally has fewer bits than its corresponding signature and is, therefore, more efficient to use for storage and transmission.

The back end 202 of the revocation authority 107 processes the revocation requests and generates (or updates) a signature revocation list. If the revocation request includes a signature instead of a signature hash, a hash unit 203 in the back end 202 hashes the contents of the signature to generate the signature hash. The hash function performed by the hash unit 203 may be a different hash algorithm from the one used to hash the document. The signature hash, along with the reason for revocation and revocation time, is stored in the signature revocation list until it is time to publish the list. In one embodiment, the signature revocation list is published periodically to the directory server 108 (e.g., an LDAP directory server), which is located at a well-known publicized site. The signature revocation list transmitted to the directory server 108 is signed by a signature revocation certificate 204 for authentication purposes. The signature revocation certificate 204 may be issued by the certificate authority 105 or other trusted certificate authorities.

The published signature revocation list 118 is stored in the data repository 112 coupled to the directory server 108. Each entry in the signature revocation list 118 includes a signature hash 213 to identify a particular signature for a particular signed document, a revocation time 214 to indicate a point of time or a time period when the signature is revoked, and a reason 215 for revocation. If the revocation time 214 is not specified, all instances of the signature (the same document encrypted by the same key but signed at different times) are revoked. If the revocation time 214 indicates a point of time, all instances of the signature created on or after the revocation time are revoked. If the revocation time 214 indicates a period of time, all instances of the signature created during the time period are revoked. Thus, if a document is encrypted by the same encryption key to generate a signed document multiple times, the revocation time 214 can be used to select which one or more uses of the encryption key on the document are to be revoked.

Although FIG. 2 shows the creation and publication of the signature revocation list 118 are performed in centralized locations, a skilled person in the art would appreciate that the signature revocation list 118 may be issued by any one of the clients 102 and the application servers 104 in alternative embodiments.

Figure 3:
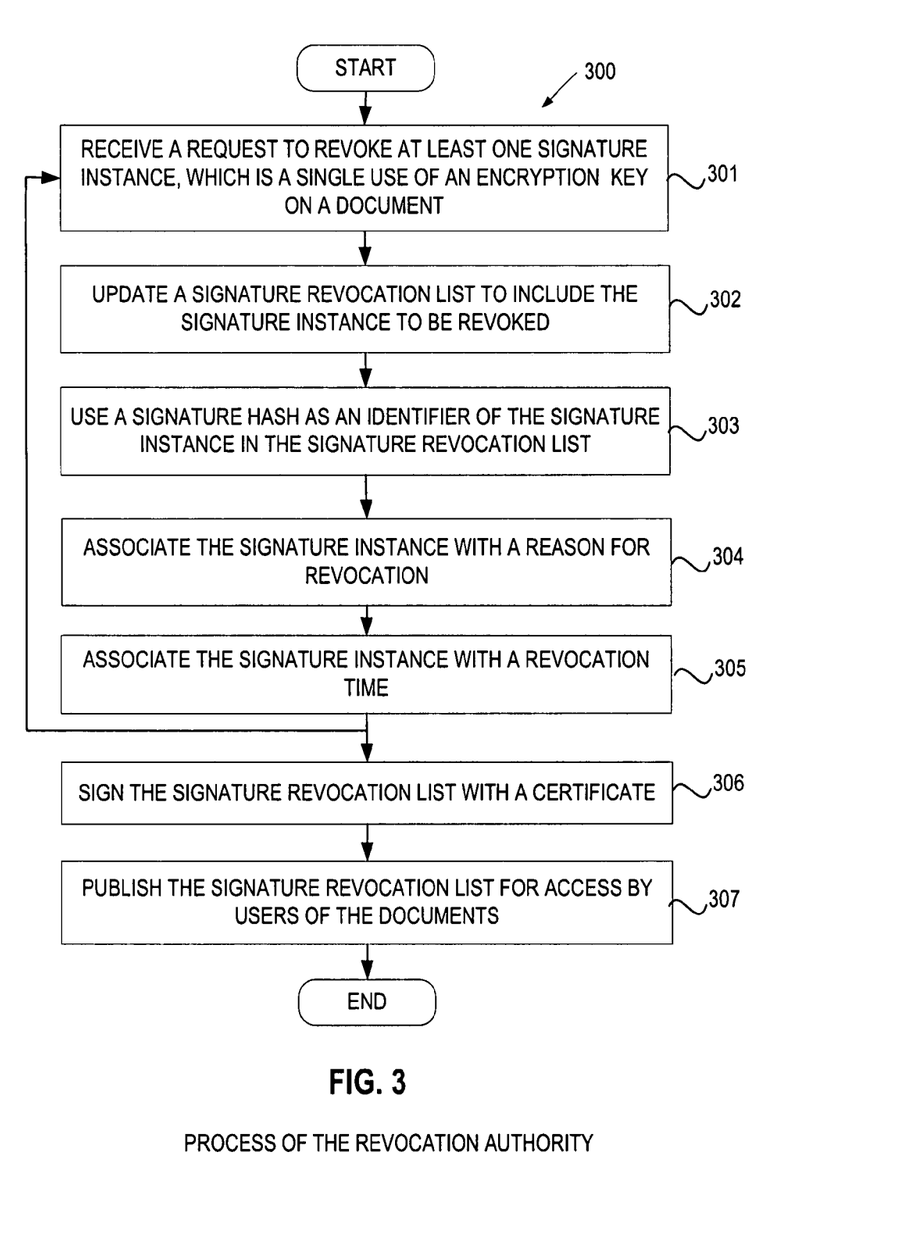
FIG. 3 is a flow diagram of one embodiment of a process of generating a signature revocation list.

FIG. 3 illustrates a flow diagram of one embodiment of a process 300 for generating a signature revocation list. The process 300 may be performed by processing logic 626 of FIG. 6 that may comprise hardware (e.g., circuitry, dedicated logic, programmable logic, microcode, etc.), software (such as instructions run on a processing device), or a combination thereof. In one embodiment, the process 300 is performed by the revocation authority 107 of FIG. 1 and FIG. 2.

Referring to FIG. 3, at block 301, the process 300 begins with the processing logic 626 receiving a revocation request for revoking at least one signature instance. The term "signature instance" herein refers to a single use of an encryption key on a document in the generation of a signature. In response to the request, at block 302, the processing logic 626 generates or updates a signature revocation list to identify the signature instance to be revoked. In one embodiment, the process of generating or updating the signature revocation list further includes placing the information in the revocation request, including a signature hash, a revocation time and a reason for revocation, into the signature revocation list. If a signature, instead of a signature hash is provided by the revocation request, the signature is hashed to generate the signature hash. At block 303, the signature hash is placed into the revocation list as an identifier of the revoked signature instance. At block 304, the revoked signature instance is associated with a reason for revocation as indicated by the revocation request. At block 305, the revoked signature instance is associated with a revocation time if the revocation time is provided by the revocation request. The revocation authority 107 may repeat the update to the signature revocation list for a predetermined period of time (blocks 301-305). When the predetermined period of time expires, at block 306, the signature revocation list is signed with a certificate issued by a trusted certificate authority. At block 307, the signature revocation list is published to a well-known networked location for access by users of the signed document.

Figure 4:
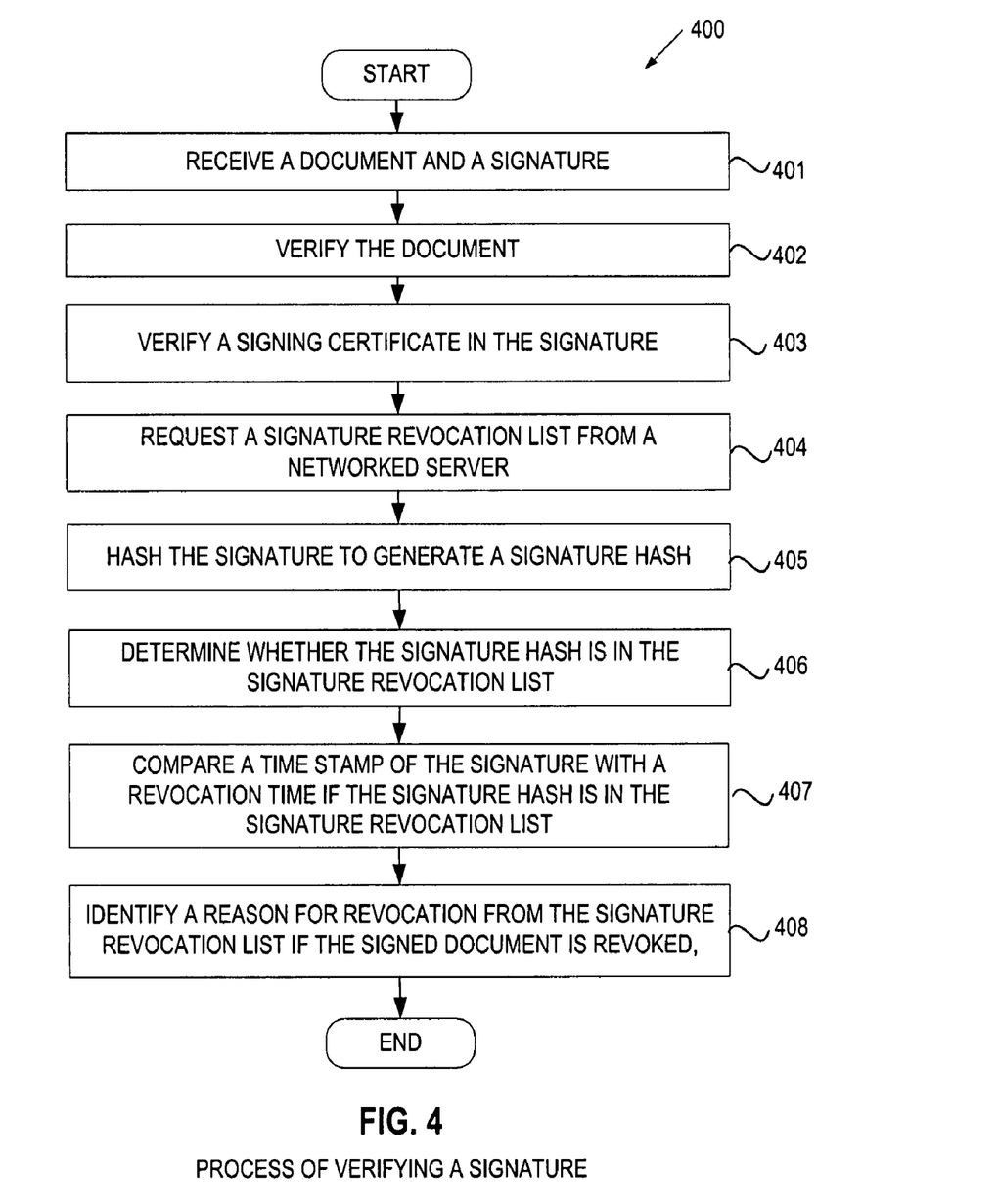
FIG. 4 is a flow diagram of one embodiment of a process that verifies a signature in a signed document by downloading the signature revocation list.

FIG. 4 illustrates a flow diagram of one embodiment of a process 400 for verifying a signed document. The process 400 may be performed by processing logic 626 of FIG. 6 that may comprise hardware (e.g., circuitry, dedicated logic, programmable logic, microcode, etc.), software (such as instructions run on a processing device), or a combination thereof. In one embodiment, the process 400 is performed by the clients 102 or the application servers 104 of FIG. 1.

Referring to FIG. 4, at block 401, the process 400 begins with the processing logic 626 receiving a signed document from a document source (e.g., one of the clients 102 or application servers 104). The signed document includes a document D and a signature S. In one embodiment, the signature S is a concatenation of a hash algorithm identifier, an encrypted document hash T, and a signing certificate of the document source. The encrypted document hash T is generated by hashing the document D with a hash function identified by the hash algorithm identifier to produce a document hash H, followed by encrypting the document hash H with an encryption key, such as the private key of the document source. The signing certificate contains a public key corresponding to the private key to allow the recipient of the signed document to decrypt the encrypted document hash T using the public key.

At block 402, the validity of the received document D is verified. First, the encrypted document hash T is decrypted to generate a document hash H, using the public key in the signing certificate. The received document D is then hashed to form H', using the hash function identified by the hash algorithm identifier. The two document hashes H and H' are compared to determine if they are equal. If they are equal, it indicates that the document was not tampered with in transit. It also indicates that the document was signed by a private key corresponding to the public key used for the decryption. It further indicates that identity of the signer of the document (the document source), as indicated in the signing certificate, corresponds to the owner of the public key.

After the document is verified, at block 403, the signing certificate in the signature S is verified. It is known in the art that revocation status of certificates can be stored in a certificate revocation list, which can be downloaded by a user for determining whether a certificate has been revoked. A certificate is typically identified by a serial number. If the serial number is in the certificate revocation list, a certificate revocation time is compared with the signing time of the document to determine whether the signing certificate is valid at the time of signing.

If both the document and the signing certificate are valid, the process 400 proceeds to block 404, at which point it is determined whether the signature has been revoked. The received signature S is hashed to generate a signature hash. The hash function for the signature hash is predetermined and is the same as the hash function for creating the signature revocation list.

At block 405, a most recent copy of the signature revocation list is fetched from a networked server that publishes the signature revocation list. At block 406, the recipient of the document checks if the signature hash is in the list. If it is in the list, at block 407, the recipient compares the signing time of the document with the signature revocation time, if the signature is time-stamped and a signature revocation time is provided in the list. If the signature is determined to be revoked, at block 408, the recipient identifies the reason for revocation from the signature revocation list.

A skilled person in the art would appreciate that it is not necessary to download the signature revocation list to the recipient of a signed document in some alternative embodiments. Instead, the recipient may compute and submit a signature hash to a networked server (e.g., the directory server 108 of FIG. 1), using an Online Certificate Status Protocol (OCSP), for determining the revocation status of the signed document. The OCSP has the primary benefit of requiring less network bandwidth and thus enabling real-time and near real-time status checks for high volume or high value operations.

Figure 5:
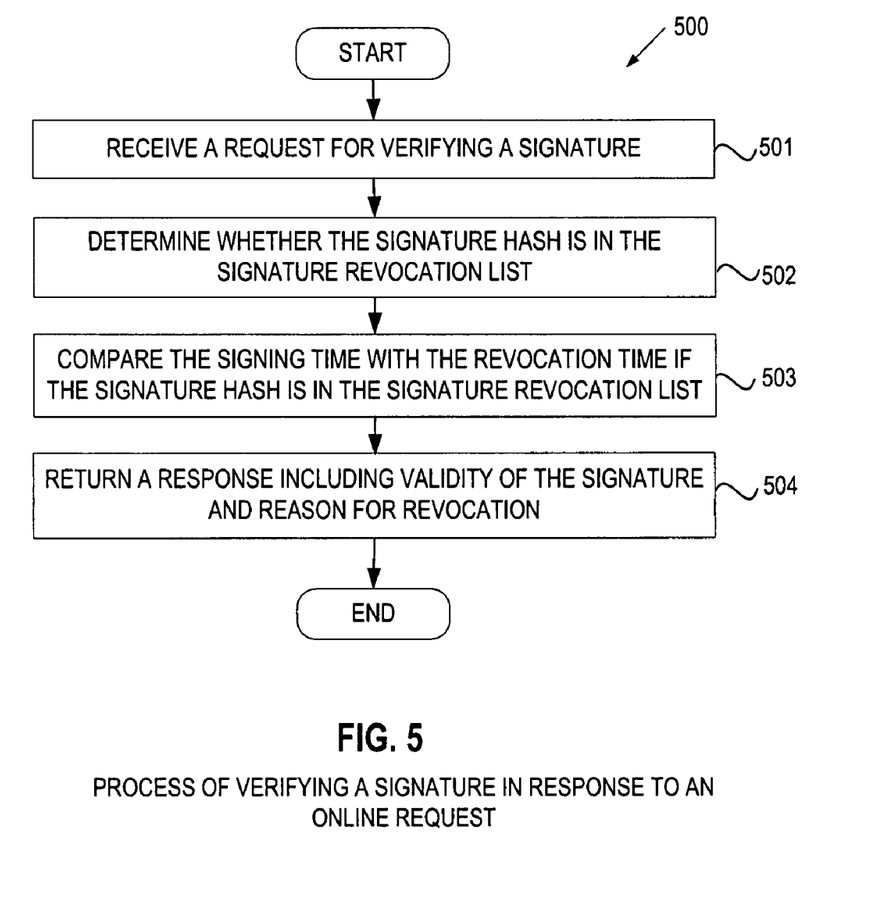
FIG. 5 is a flow diagram of one embodiment of a process that verifies a signature in a signed document by an online inquiry.

FIG. 5 illustrates a flow diagram of an alternative embodiment of a process 500 for online verification of a signed document. The process 500 may be performed by processing logic 626 of FIG. 6 that may comprise hardware (e.g., circuitry, dedicated logic, programmable logic, microcode, etc.), software (such as instructions run on a processing device), or a combination thereof. In one embodiment, the process 500 is performed by the directory server 108 of FIG. 1 and FIG. 2.

Referring to FIG. 5, at block 501, the process 500 begins with the processing logic 626 receiving a request for checking the validity of a signature for a document. The request identifies the signature hash of the signature and may also include a signing time of the document. At block 502, it is determined whether the signature hash is in the signature revocation list. If it is in the list, at block 503, the signing time is compared with a signature revocation time, if the signing time is included in the request and the signature revocation time is provided in the list. If the signature is determined to be revoked, at block 504, a response, including the validity of the signature and a reason for revocation, is returned to the requester.

Figure 6:
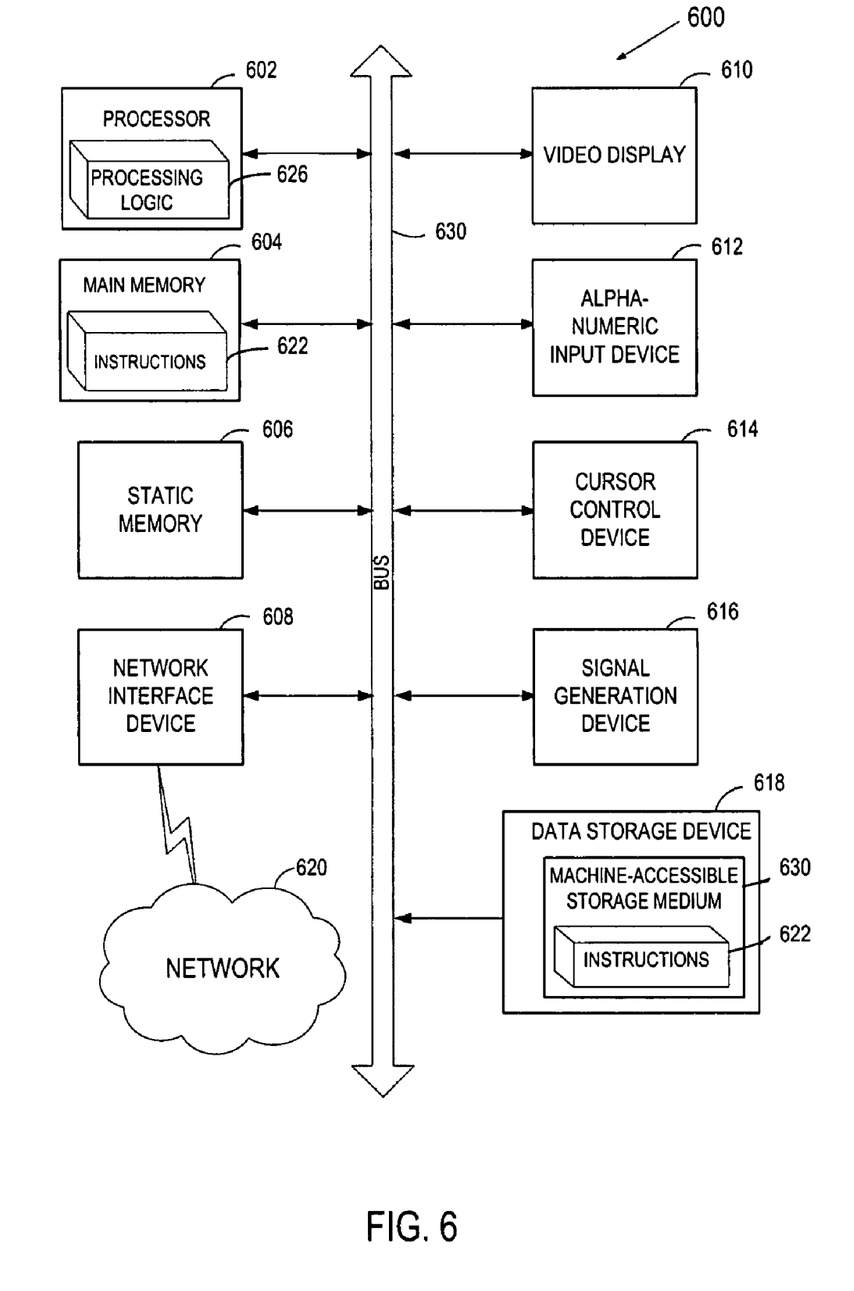
FIG. 6 illustrates a block diagram of an exemplary computer system implementing some embodiments of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 630 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-accessible storage media. The software 622 may further be transmitted or received over a network 620 via the network interface device 608.

The machine-accessible storage medium 630 may also be used to store the signature revocation list 118 of FIG. 1. While the machine-accessible storage medium 630 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Thus, a method and system for revoking a digital signature have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method, implemented by a server computer system programmed to perform the following, comprising:
   generating, by the server computer system, a signature revocation list to indicate revocation status of a signature used by a signer to sign a document, the signature comprising a signing certificate issued by a trusted authority and the document that has been hashed by a hash function and encrypted by a private key of the signer of the document;
   computing, by the server computer system, an identifier of the signature in the signature revocation list based on contents of the signature; and
   publishing, by the server computer system, the signature revocation list for access by users of the document.

2. The method of claim 1, wherein publishing the signature revocation list further comprises:
   publishing the signature revocation list to a Lightweight Directory Access Protocol (LDAP) directory.

3. The method of claim 1, further comprising:
   associating the signature in the signature revocation list with a reason for which the signature is revoked.

4. The method of claim 1, further comprising:
   associating the signature in the signature revocation list with a revocation time to indicate a time at which the signature is revoked.

5. The method of claim 1, wherein generating a signature revocation list further comprises:
   generating the signature revocation list to revoke all instances of the signature without revoking use of the private key on other documents.

6. The method of claim 1, wherein generating a signature revocation list further comprises:
   generating the signature revocation list to revoke at least one use of the signature at a specific time.

7. The method of claim 1, further comprising:
   signing the signature revocation list with a certificate issued by a certificate authority to indicate that the signature revocation list is generated by a trusted entity.

8. The method of claim 1, wherein computing an identifier of the signature further comprises:
   hashing the signature for use as the identifier.

9. The method of claim 1, wherein the signing certificate comprises a public key corresponding to the private key.

10. The method of claim 1, wherein the signature includes a signing time of the document, the signing time issued by a time-stamping authority.

11. A system comprising:
   data storage to store a signature revocation list to indicate revocation status of a signature used by a signer to sign a document, the signature comprising a signing certificate issued by a trusted authority and the document that has been hashed by a hash function and encrypted by a private key of the signer of the document; and
   a revocation server computer system coupled to the data storage to generate the signature revocation list in which the signature is to be identified based on contents of the signature, and to publish the signature revocation list for access by users of the document.

12. The system of claim 11, further comprising:
   a certificate authority computer system coupled to the revocation server computer system to issue a certificate to the revocation server computer system to indicate that the signature revocation list is generated by a trusted entity.

13. The system of claim 11, further comprising:
   an application server computer system coupled to the revocation server computer system, the application server computer system issued with the signing certificate to sign the document, validity of the signing certificate unaffected by revocation of the signature.

14. The system of claim 11, wherein the revocation server computer system comprises:
   a hash unit computer system to hash the signature of the document for inclusion in the signature revocation list.

15. The system of claim 11, further comprising:
   a directory server computer system coupled to the revocation server computer system and the data storage, the directory server computer system to publish the signature revocation list and to respond to queries about validity of a signed document.

16. The system of claim 11, further comprising:
   a time-stamping authority computer system accessible to signers of the document, the time-stamping authority computer system to time-stamp the signature when the document is signed.

17. The system of claim 11, wherein the signature revocation list includes a reason for revocation and a revocation time.

18. A non-transitory computer readable storage medium including instructions that, when executed by a processing system, cause the processing system to perform a method comprising:
   generating a signature revocation list to indicate revocation status of a signature used by a signer to sign a document, the signature comprising a signing certificate issued by a trusted authority and the document that has been hashed by a hash function and encrypted by a private key of the signer of the document;
   computing an identifier of the signature in the signature revocation list based on contents of the signature; and
   publishing the signature revocation list for access by users of the document.

19. The computer readable storage medium of claim 18 wherein the method further comprises:
   associating the signature in the signature revocation list with a reason for which the signature is revoked.

20. The computer readable storage medium of claim 18 wherein the method further comprises:
   associating the signature in the signature revocation list with a revocation time to indicate a time at which the signature is revoked.

21. A method, implemented by a client computer system programmed to perform the following, comprising:
- receiving, by the client computer system, a document and a signature used by a signer to sign a document, the signature comprising a signing certificate issued by a trusted authority and the document that has been hashed by a hash function and encrypted by a private key of the signer of the document;
- submitting by the client computer system a request for verifying the signature, the request including an identifier computed from contents of the signature; and
- receiving, by the client computer system, a response to the request, the response indicating validity of the signature.

22. The method of claim 21, wherein receiving a response further comprises:
- receiving a signature revocation list in the response, the signature revocation list indicating revocation status of a plurality of signatures.

23. The method of claim 21, further comprising:
computing the identifier by hashing the signature.

24. A non-transitory computer readable storage medium including instructions that, when executed by a processing system, cause the processing system to perform a method comprising:
- receiving a query identifying a signature used by a signer to sign a document, the signature comprising a signing certificate issued by a trusted authority and the document that has been hashed by a hash function and encrypted by a private key of the signer of the document;
- determining whether the signature is in a signature revocation list that indicates revocation status of a plurality of signatures; and
- responding to the query by indicating validity of the signature.

25. The computer readable storage medium of claim 24, wherein determining whether the signature is in a signature revocation list further comprises:
- using a signature hash as an identifier for determining whether the signature is in the signature revocation list.

* * * * *